May 9, 1939.　　　　H. W. McDONALD　　　　2,157,211
FRICTION CLUTCH
Filed Dec. 16, 1935　　　6 Sheets-Sheet 1

INVENTOR
HARRY W. McDONALD
BY
ATTORNEYS

May 9, 1939.　　　H. W. McDONALD　　　2,157,211
FRICTION CLUTCH
Filed Dec. 16, 1935　　　6 Sheets-Sheet 2

INVENTOR
HARRY W. McDONALD
BY
ATTORNEYS

May 9, 1939.　　　　H. W. McDONALD　　　　2,157,211
FRICTION CLUTCH
Filed Dec. 16, 1935　　　6 Sheets-Sheet 4

INVENTOR
HARRY W. McDONALD
BY
ATTORNEYS

May 9, 1939.  H. W. McDONALD  2,157,211
FRICTION CLUTCH
Filed Dec. 16, 1935   6 Sheets-Sheet 5

INVENTOR
HARRY W. McDONALD
BY
ATTORNEYS

May 9, 1939.  H. W. McDONALD  2,157,211
FRICTION CLUTCH
Filed Dec. 16, 1935  6 Sheets-Sheet 6

INVENTOR
HARRY W. McDONALD
BY Paul, Paul Moore
ATTORNEYS

Patented May 9, 1939

2,157,211

UNITED STATES PATENT OFFICE 2,157,211

FRICTION CLUTCH

Harry W. McDonald, Minneapolis, Minn.

Application December 16, 1935, Serial No. 54,686

5 Claims. (Cl. 192—76)

This invention relates to new and useful improvements in clutches, and more particularly to friction clutches.

An object of the invention is to provide a clutch of the class described, comprising a drum adapted to be secured to a suitable driving member, and a driven member having a plurality of friction shoes operatively connected thereto and provided with a plurality of eccentric elements having means for actuating them to move the friction shoes into or out of driving engagement with the drum.

A further object is to provide a friction clutch comprising a drum adapted to be secured to a drive shaft, and a driven member having friction shoes for engaging the drum to thereby operatively connect it to the drive shaft for rotation therewith, said shoes being moved into driving engagement with the drum by a plurality of eccentrics having operative connections with rack bars mounted for axial movement on the member and constantly urged in a direction to move the friction shoes into driving engagement with the drum, means being provided for operating the rack bars to move the friction shoes into or out of driving engagement with the drum.

A further object is to provide a clutch which is particularly applicable for use in connection with automobiles, trucks, and other power driven vehicles, and which also readily lends itself for use in connection with large stationary engines, well-drilling apparatus, marine engines, and various other types of apparatus requiring a friction clutch, which may be conveniently operated with little or no effort.

Other objects of the invention reside in the unique construction of the clutch operating mechanism, whereby the friction shoes may readily be moved into or out of driving engagement with the friction drum by a member movable in an axial direction with respect to the axis of the clutch; in the provision of suitable eccentrics and rack bars for actuating the friction shoes; in the novel arrangement of the spring elements which constantly urge the rack bars in a direction to move the friction shoes into driving engagement with the drum; in the unique manner of mounting the spider or eccentric carrying member upon the driven shaft, whereby the load transmitted from the spider to the driven shaft is cushioned to thereby prevent shocks and vibration from being transmitted from the drive to the driven shaft; in the novel manner of mounting the cushion means between the hub of the spider and the splined sleeve secured to the driven shaft, whereby the spider and said sleeve become, in effect, an integral unit; in the provision of means whereby the connections between the friction shoes and the eccentrics may be varied in length to compensate for wear in the various parts of the clutch; in the provision of a heavy duty friction clutch comprising pivoted levers for moving the friction shoes into driving engagement with the drum, and whereby the levers of each friction shoe are actuated by an eccentric operated by dual rack bars, and wherein the connections between said levers and the eccentrics are so constructed that the levers may be adjusted independently of one another and also whereby said connections may be so adjusted that the clutch may be set for driving a load with a very slight pressure upon the operating member; in the provision of a clutch comprising a plurality of friction shoes, each of which is moved into operative engagement with the drum by a pair of pivoted elements operatively connected to a single connecting rod which, in turn, is connected to a forked eccentric adapted to be rotated by a rack bar mounted for sliding movement upon the hub of the spider or frame member which supports the eccentrics and friction shoes; and, in the general construction and arrangement of the various parts of the structure, which will be clearly set forth in the annexed specification.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

Figure 1:
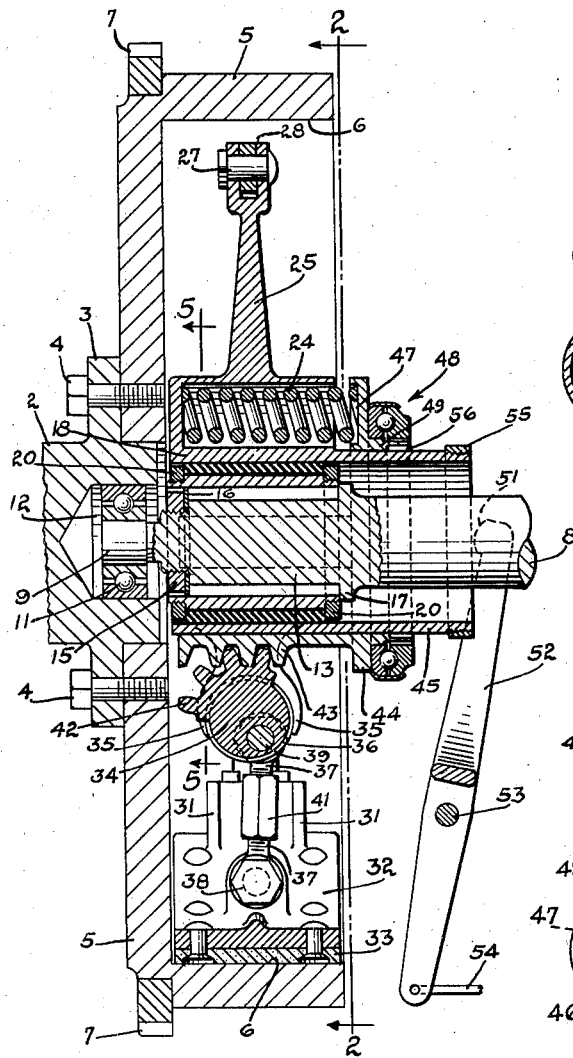
Figure 1 is a vertical sectional view on the line 1—1 of Figure 2, showing the general construction of the clutch.

In the selected embodiment of the invention here shown, there is illustrated in Figure 1, for purposes of disclosure, the end portion 2 of a drive shaft, which may be the crank shaft of an engine. This drive shaft is shown provided with a flange 3, to which is secured, by suitable bolts 4, a drum 5 having a friction surface 6 which, in the present instance, is cylindrical in form. The drum 5 may represent the fly wheel of an internal combustion engine and is shown provided with a ring gear 7 adapted to be engaged by the starter pinion, not shown. A driven shaft 8 is shown axially alined with the drive shaft 2 and has a terminal 9 supported in a suitable antifriction bearing 11, retained in a socket 12 in the adjacent end of the drive shaft 2. The driven shaft 8 may represent the usual drive shaft of an automobile.

The driven shaft 8 is shown provided with a splined end 13, upon which is mounted a sleeve 14 retained thereon by a clamping nut 15 received in threaded engagement with a portion of the shaft 8 and engaging a washer 16, which bears against one end of the sleeve 14, the opposite end of which is seated against a shoulder 17 provided on the shaft 8.

Figure 5:
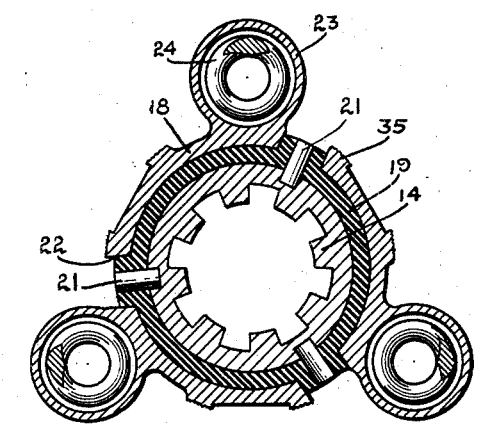
Figure 5 is a detail sectional view on the line 5—5 of Figure 1, showing the means for cushioning the load transmitted from the drive to the driven shaft.
Figure 6:
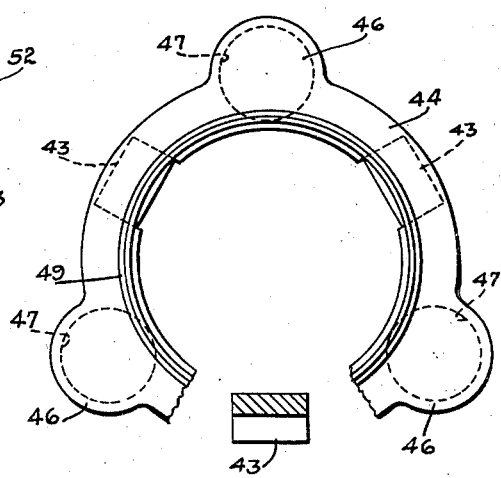
Figure 6 is an end view of the spring retaining member partially broken away to show the rack bars provided thereon.
Figure 7:
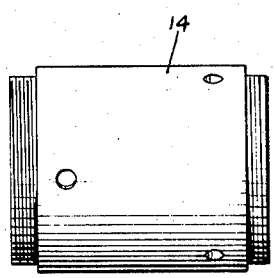
Figure 7 is a side elevation of the splined sleeve on the end of the driven shaft removed from the shaft.

A hub 18 is concentrically mounted on the splined sleeve 14 by a suitable cushion element 19, preferably of rubber. The bore of the hub 18 is relatively larger in diameter than the outside diameter of the sleeve 14, whereby an annular gap is provided between these parts adapted to receive the cushion element 19. As best shown in Figure 5, the cushion element is interposed between the bore of the hub 18 and the periphery of the sleeve 14, while in a molten or plastic state, whereby the hub and sleeve are yieldably secured together as a unitary structure, but have no metal-to-metal contact therebetween. Suitable ring nuts 20 are provided at the ends of the sleeve 14, as shown in Figure 1. The diameter of these nuts is less than the diameter of the base of the hub 18 to prevent metal-to-metal contact therebetween. A series of pins 21 are secured in the periphery of the sleeve 14 and project outwardly therefrom into suitable openings 22 provided in the hub 18. The openings 22 are relatively larger in diameter than the diameter of the pins 21, and receive portions of the cushion element 19, into which portions, the projecting terminals of the pins 21 are embedded, thereby to non-rotatably connect together the sleeve and hub, as shown in Figure 5.

Figure 2:
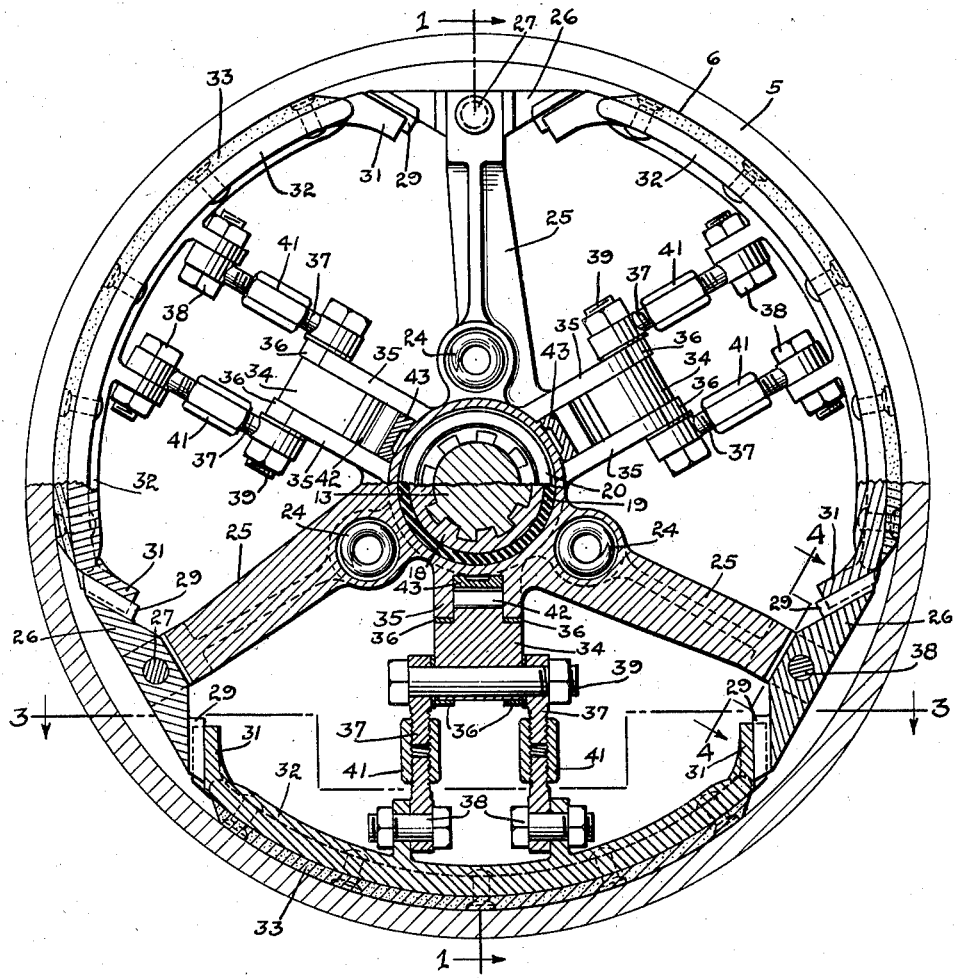
Figure 2 is a sectional view on the line 2—2 of Figure 1, showing the preferred arrangement of the friction shoes and the means for supporting them.
Figures 3, 4:
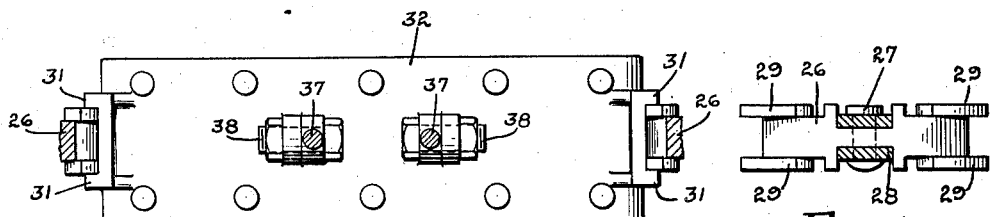
Figure 3 is a detail sectional view on the line 3—3 of Figure 2.
Figure 4 is a detail sectional view on the line 4—4 of Figure 2, showing the pivoted connection between the arms of the spider and the radial guides for the friction shoes.

The hub 18 is shown provided with a plurality of sockets 23 having their axes disposed in parallel relation to the axis of the hub 18. These sockets are adapted to support suitable springs 24, as clearly illustrated in Figure 1. The hub 18 is further provided with a plurality of radial arms 25 having their outer ends terminating adjacent the friction surface 6 of the drum 5, and each having a suitable guide member 26 secured thereto in fixed relation by suitable rivets or bolts 27. The terminals of the arms 25 are preferably forked, as shown at 28 in Figure 4 to receive the intermediate portions of the guide members 26. The guide members 26 have oppositely disposed inclined guides 29 adapted to be engaged by the terminals 31 of a plurality of friction shoes 32, as best illustrated in Figure 2. By reference to this figure, it will be noted that the guides 29 of each friction shoe 32 are disposed in parallel relation, whereby the shoes 32 may readily be moved in a radial direction into or out of driving engagement with the drum 5, as will subsequently be described. Each friction shoe is provided with a suitable lining 33 adapted to engage the surface 6 of the drum.

An important feature of the present invention resides in the novel means provided for moving the friction shoes 32 into and out of driving engagement with the drum 5 to control the operation of the clutch. The means provided for thus operating the shoes 32 is best shown in Figure 1, and comprises a plurality of eccentrics 34, one for each friction shoe, shown mounted in suitable yokes or forked lugs 35, preferably made integral with the hub 18. The eccentrics are retained in said yokes by suitable rings 36 fitted over the cylindrical ends of the eccentrics, as shown in Figures 1 and 2, and supported in the yokes 35. The rings 36 are preferably non-rotatably supported in the yokes, whereby the terminals of the eccentrics rotate in the rings 36.

In the form shown in Figures 1 and 2, each friction shoe 32 is connected to its respective eccentric 34 by suitable connecting rods 37, having their outer ends pivotally connected to the friction shoes by suitable pivot bolts 38, and their inner ends to the eccentrics by suitable bolts 39. The connecting rods 37 are provided with turnbuckles 41, whereby they may be adjusted longitudinally to allow for wear in the lining or facing 33 of the shoes 32. Suitable means, not shown, is provided for locking the turnbuckles 41 in adjusted positions.

Each eccentric 34 is shown provided on its periphery with a plurality of gear teeth 42 engaging rack bars 43 secured to a flanged collar 44 mounted for sliding movement upon the reduced extension 45 of the hub 18, as best shown in Figure 1. The collar 44 has outwardly projecting portions 46 alined with the sockets 23 in the hub 18. The projecting portions 46 have suitable seats 47 therein adapted to receive the adjacent ends of the springs 24, whereby the springs 24 constantly urge the collar 44 in a direction towards the right, when viewed as shown in Figure 1. Such movement of the collar 44 will cause the rack bars 43 to rotate the eccentrics in a direction to force the friction shoes into driving engagement with the drum 5, as will readily be understood by reference to Figure 1.

A suitable thrust bearing, generally indicated by the numeral 48, is mounted upon a cylindrical extension 49 of the collar 44, and is adapted to be engaged by the end portion 51 of a forked operating lever 52, shown pivoted at 53 and having a suitable connection 54 secured thereto, whereby the arm 52 may be conveniently operated to move the collar 44 in a direction against the tension of the springs 24, thereby to release the friction shoes 32. An annular collar 55 is shown received in threaded engagement with the outer end of the extension 45 of the hub 18 to limit outward movement of the collar 44.

The extension 49 of the collar 44 is shown provided with a counterbore 56 adapted to receive the annular collar 55. Because of the counterbore 56, the overall length of the extension 45 of the hub 18 may be relatively shortened, it being understood that if desired, the terminal of the extension 49 of the collar could be arranged to engage directly with the adjacent end of the annular collar 55, to thereby limit outward movement of the collar 44.

By referring to Figure 1, it will be noted that the pivot pins or bolts 39 connecting the rods 37 to the eccentrics are so arranged with respect to the axes of the eccentrics that the slightest movement of the rack bars 43 may move the friction shoes into or out of driving engagement with the drum 5. It is also to be noted that the springs 24 constantly exert an outward force against the collar 44, thereby to normally retain the friction shoes in driving engagement with friction surface 6 of the drum 5. The cushion element 19, previously described, is an important part of the clutch, in that it positively prevents the transmission of shocks and vibration to the driven shaft 8, which is of particular importance when the clutch is used in automobiles for transmitting power from the engine to the drive shaft.

The various parts of the clutch are so constructed and arranged that wear in the lining 33 of the friction shoes may readily be taken up by simply adjusting the turnbuckles 41 of the connecting rods 37. Because of the novel mechanism employed for actuating the friction shoes, a very slight movement of the collar 44 is sufficient to move the friction shoes entirely out of driving engagement with the surface 6 of the drum, thus reducing to a minimum, the travel of the clutch pedal. This is a very desirable feature in automobile clutches, as it greatly facilitates operating the car. The springs 24, which normally hold the friction shoes in driving engagement with the drum, are substantially concealed in the sockets 23.

Figures 8 to 13, inclusive, illustrate a clutch of a slightly modified construction, and which is adapted more particularly to heavy duty work. The clutch here illustrated is shown provided with a drum or fly wheel 61 having a hub 62, shown non-rotatably secured to a drive shaft 63. The drum has a cylindrical friction surface 64 adapted to be engaged by a plurality of friction shoes, generally indicated by the numeral 65, and each having a suitable lining 66. A driven shaft 67 is shown axially alined with the drive shaft 63 and may be provided with a reduced terminal 68 adapted to be rotatably supported in a suitable bearing 69 provided in the adjacent end of the drive shaft 63.

Figure 8:
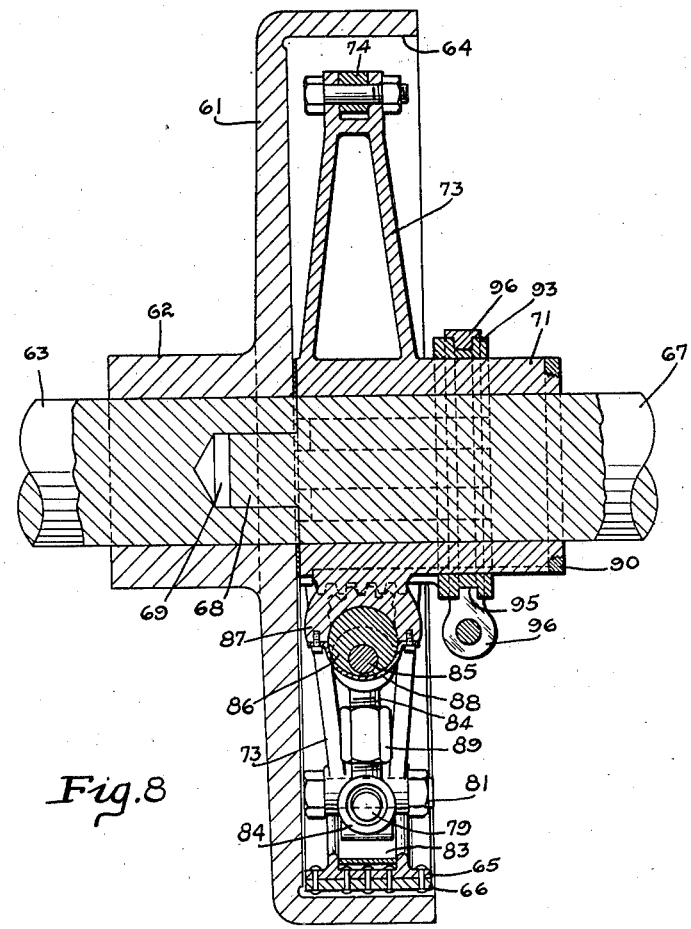
Figure 8 is a vertical sectional view on the line 8—8 of Figure 9, showing a clutch of somewhat different construction, in which pivoted arms are utilized for moving the friction shoes into driving engagement with the friction drum.
Figure 9:
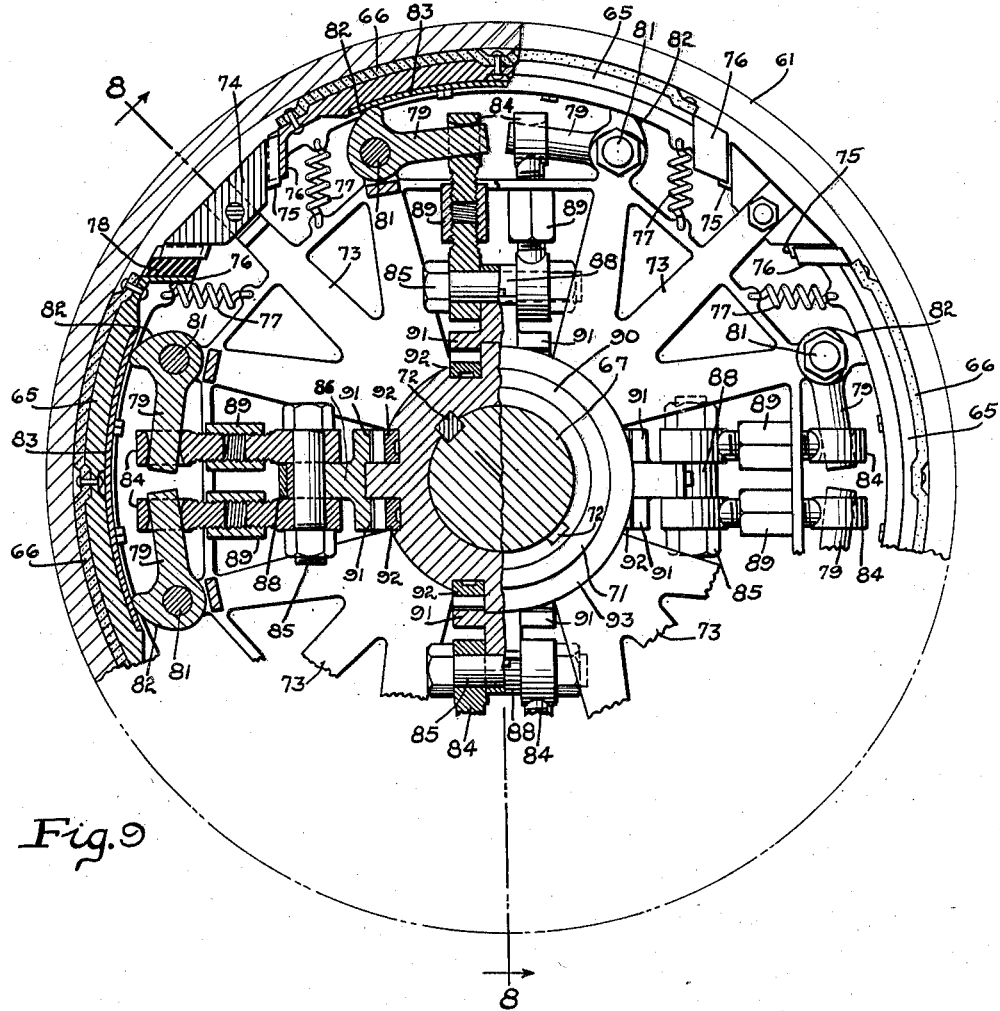
Figure 9 is an end view of Figure 8, partially broken away to show the arms for operating the friction shoes, and also showing the cushion means provided between the friction shoes and their guides.
Figures 10, 11:
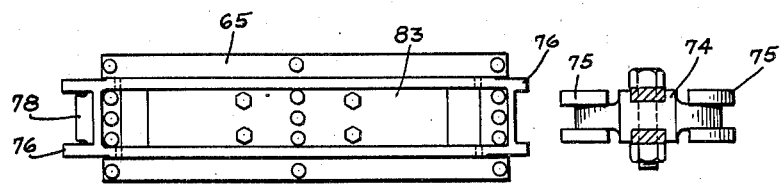
Figure 10 is a plan view of one of the friction shoes removed from the clutch.
Figure 11 is a detail sectional view showing one of the pivotal connections between the spider and the guides for the friction shoes.

The hub 71 is fixedly secured to the driven shaft 67 by such means as a key 72, and has a plurality of outwardly extending arms 73, preferably shaped as shown in Figures 8 and 9, thereby to provide a very rigid and substantial structure. Suitable guide members 74 are secured to the outer ends of the arms 73 and are provided with guides 75 adapted to be engaged by the end portions 76 of the friction shoes 65, as best shown in Figure 9, whereby the friction shoes 65 are guidingly supported in a manner somewhat similar to the shoes 32, shown in Figures 1 and 2. A plurality of suitable tension springs 77 connect the ends of the friction shoes to the arms 73, as clearly illustrated in Figure 9, to constantly hold them in contact with their respective cam levers 82, as best illustrated in Figure 9. This is necessary because the shoes are not positively connected to the cam levers, as in Figures 1 and 2.

In the form shown in Figures 8 and 9, suitable cushion elements 78, preferably of a suitable rubber, are interposed between the ends of the friction shoes and the guide members 74 to cushion the load when the power is transmitted from the drive shaft 63 to the driven shaft 67 through the clutch. If desired, a cushion element may be provided at each end of each friction shoe, so that the load will be cushioned in either direction of rotation of the clutch provided, of course, that the clutch is used in connection with a drive shaft capable of operating in either direction of rotation. In the drawings, however, I have shown but one cushion element used in connection with each shoe. When the clutch is used for transmitting power from the crank shaft of an internal combustion engine, the clutch will only be operated in one direction of rotation and cushion elements 78 would therefore be necessary at one end only of each friction shoe.

In the heavy duty clutch illustrated in Figures 8 and 9, the friction shoes 65 are moved into and out of driving engagement with the drum 61 by suitable cam levers 79, pivotally supported upon the arms 73 by suitable pivots 81. Each cam lever has a cam 82 adapted to engage a wear plate 83 secured to the friction shoes 65, as clearly illustrated in Figure 9.

The cam levers 79 of each friction shoe are oppositely disposed, as illustrated in Figure 9, and have their adjacent or inner ends operatively connected to the outer ends of a pair of connecting rods 84, the inner ends of which are secured to pins 85 supported in eccentrics 86. These eccentrics are rotatably mounted in yokes 87, shown integrally formed with the hub 71, and are retained in said yokes by suitable metallic straps 88, having their terminals secured to the yokes 87 and functioning as bearing caps to retain the eccentrics in the yokes. The connecting rods 84 are preferably constructed in a manner similar to the connecting rods 37, shown in Figures 1 and 2, and are provided with turnbuckles 89, whereby they are adapted for independent adjustment to accurately position the ends of the friction shoes with respect to the drum 61.

Figures 12, 13:
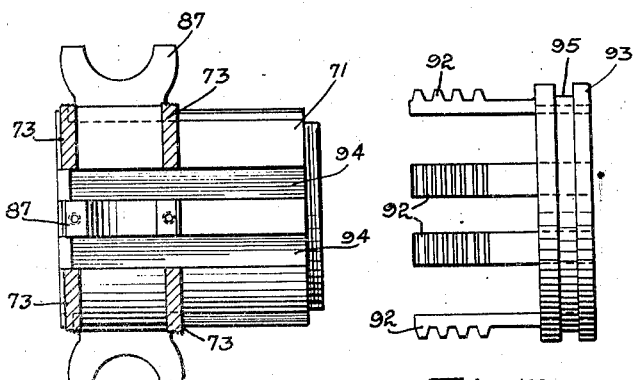
Figure 12 is a detail view, partially in section, showing the hub of the spider removed from the shaft.
Figure 13 is a detail view showing the rack bars for actuating the eccentrics and the collar to which said rack bars are secured and which is slidable upon the hub of the spider to thereby rotate the eccentrics.

The eccentrics 86 are each shown provided with spaced apart gear segments 91, disposed at opposite sides of the yokes 87, as best shown in Figure 9. The gear segments 91 mesh with spaced racks bars 92 secured to a collar 93 mounted for sliding movement upon the hub 71, as will readily be understood by reference to Figure 8. In Figure 13, the collar 93 is shown removed from the hub 71 to more clearly illustrate the arrangement of the rack bars 92 thereon. The rack bars, it is to be understood, are slidable in longitudinal guides 94, provided in the periphery of the hub 71, as illustrated in Figures 9 and 12. The collar 93 is shown provided with an annular groove 95 adapted to receive a suitable split member 96, which may be connected to a suitable operating lever, not shown, for longitudinally translating the collar 93 upon the hub 71, thereby to move the friction shoes into and out of driving engagement with the drum 64. A suitable ring nut 90 is mounted upon the end of the hub 71 to prevent detachment of the collar 93.

In the form shown in Figures 8 and 9, the outward force or pressure applied to the friction shoes 65 to move them into driving engagement with the drum 61, is exerted adjacent the ends thereof, whereby each friction shoe will be forced into driving engagement with the drum its full length and with substantially uniform pressure. The operation of the clutch is substantially the same as the clutch illustrated in Figures 1 and 2, the eccentrics and rack bars providing means whereby the clutch may be rendered operative or inoperative with a very light pressure on the clutch pedal, even though the clutch is capable of transmitting heavy loads from one shaft to another. A suitable spring, not shown, may be operatively associated with the collar 93 to constantly urge the friction shoes 65 into contact with the drum 64, in a manner similar to the structure illustrated in Figure 1.

Figure 14:
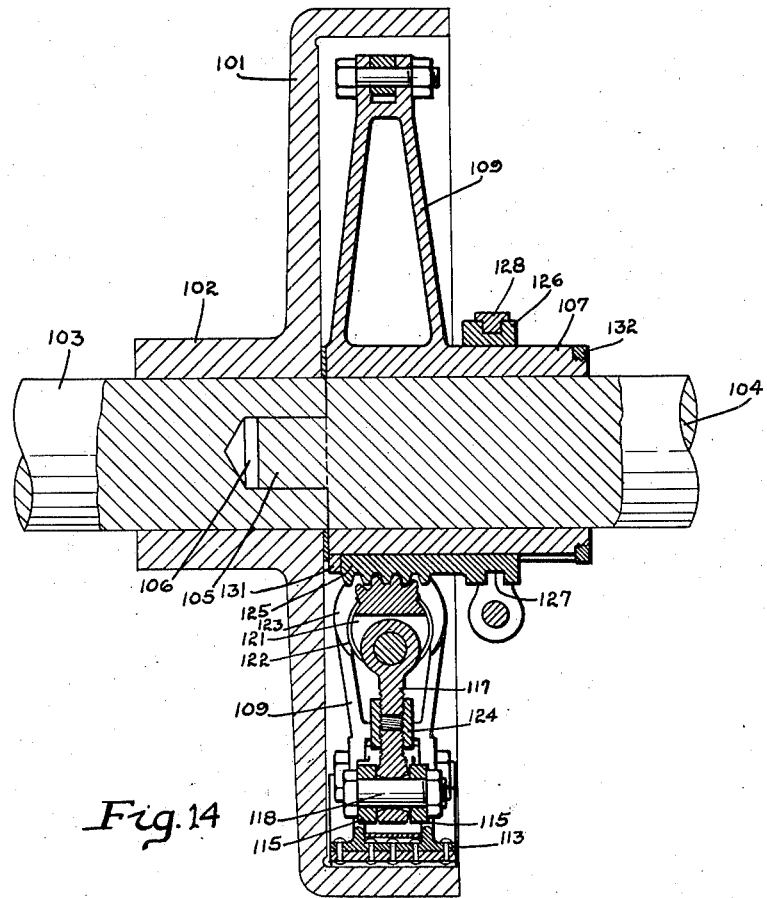
Figure 14 is a vertical sectional view on the line 14—14 of Figure 15, showing a clutch wherein the arms for each friction shoe are moved into driving engagement with the drum by a single connecting link operatively connected to an eccentric.
Figure 16:
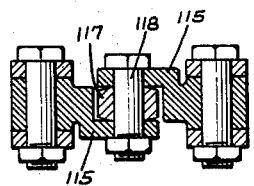
Figure 16 is a detail sectional view on the line 16—16 of Figure 15.
Figure 15:
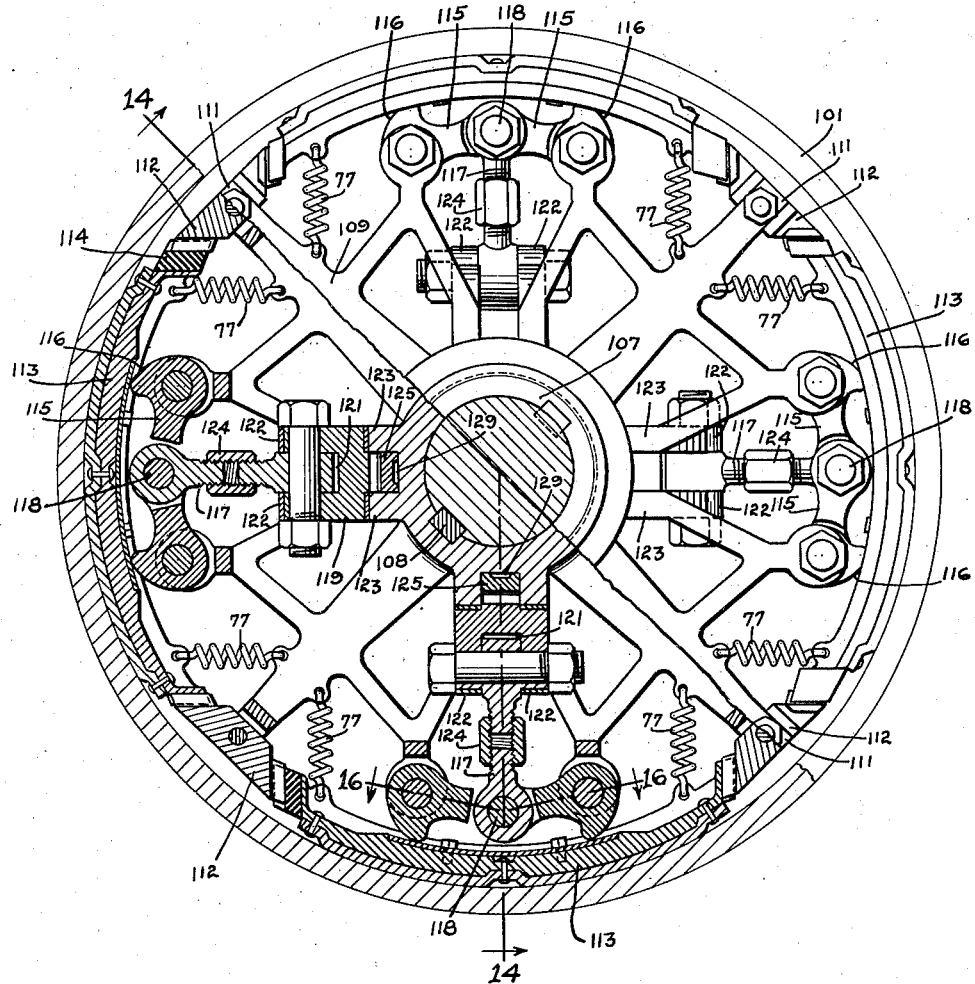
Figure 15 is an end view of Figure 14 partially in section.

The clutch illustrated in Figures 14 to 16, inclusive, is also of the heavy duty type, and is shown comprising a drum 101 having a hub 102 non-rotatably secured to a drive shaft 103. A driven shaft 104 is axially disposed with respect to the drive shaft 103 and may be provided with a reduced terminal 105 rotatably received in a suitable bearing 106 provided in the adjacent end of the drive shaft 103.

A hub 107 is keyed to the driven shaft 104, as shown at 108 in Figure 15, and has a plurality of arms 109, which preferably are shaped as shown in Figures 14 and 15, to thereby provide a very rigid and substantial frame structure. The outer end portions 111 of the arms 109 are provided with suitable guide members 112 adapted to guidingly support a plurality of friction shoes 113 in a manner similar to the structure illustrated in Figures 8 and 9. Cushion elements 114 are shown interposed between the friction shoes 113 and the guide members 112 to cushion the torsional load transmitted from the drive shaft to the driven shaft.

The friction shoes 113 are constantly urged in an inward direction by suitable springs 77, as illustrated in Figure 15.

The means for operating the friction shoes 113 and the clutch illustrated in Figures 14 and 15, consists of a plurality of cam levers 115 having cams 116 adapted to engage the friction shoes, as clearly illustrated in Figure 15.

The clutch shown in Figures 14 and 15 differs from the one shown in Figures 8 and 9 in that the cam levers 115 of each friction shoe are pivotally connected to a single connecting rod 117 by a suitable connecting pin 118. The inner ends of the connecting rods 117 are connected to eccentrics 119, each of which is forked as shown at 121 in Figures 14 and 15 to receive the adjacent ends of the connecting rods 117. The eccentrics are rotatably supported in annular bearing members or rings 122 non-rotatably retained in dual yokes 123, shown integrally formed with the hub 107 of the clutch. Each connecting rod is provided with a suitable turnbuckle 124, whereby it may be longitudinally adjusted to accurately position the friction shoes 113 with respect to the drum 101.

The eccentrics 121 are operated by a plurality of rack bars 125 shown integrally formed with a collar 126 mounted for sliding movement upon the hub 107, and preferably provided with an annular groove 127 adapted to receive an annular split member 128, to which a suitable operating lever, not shown, may be connected. The rack bars 125 are slidable in suitable guides 129 provided in the periphery of the hub 107, and are adapted for limited sliding movement in one direction by a suitable ring nut 132, the latter being received in threaded engagement with one end of the hub 107, as shown in Figure 14. A suitable stop 131 is welded or otherwise secured to the hub 107 to limit movement of the rack bars 125 in the opposite direction.

The novel clutch herein disclosed, is very compact and very efficient in operation. The eccentrics and rack bars for actuating the friction shoes 113 provide a mechanism which is positive in operation, and which requires very little movement on the part of the clutch pedal, which is a very desirable feature in clutch operation. It will also be noted, by reference to the drawings, that the friction shoes 113 engage the greater portion of the friction surface of the drum 101, whereby the danger of slippage is substantially eliminated. This also results because of the pivotal connections between the connecting rods and the eccentrics being disposed relatively close to radial lines drawn from the axis of the clutch through the axes of the eccentrics, whereby the maximum pressure is exerted against the friction shoes by the springs provided for that purpose.

The form of clutch illustrated in Figures 1 and 2, may be made comparatively small in size, and is well suited for use in connection with automobile engines to transmit power from the usual crank shaft thereof to the driven shaft. It is also to be noted that all of the operating parts of the various forms of cutches illustrated are conveniently accessible and may readily be adjusted to take up wear in the linings of the friction shoes, which also is a very desirable feature of the clutch.

I claim as my invention:

1. In a clutch of the class described, a drive shaft, a friction drum secured thereto, a driven shaft, a member mounted on the driven shaft and adapted for rotation therewith, a plurality of rack bars mounted on said member and adapted for axial movement thereon, friction shoes, guides on said member for supporting the friction shoes and whereby they are adapted for radial movement, eccentrics having teeth on their peripheries engaging the rack bars, and means connecting the eccentrics to the friction shoes, whereby the latter may be moved into or out of driving engagement with the drum when the eccentrics are rotated by axial movement of the rack bars.

2. In a clutch of the class described, a drive shaft, a friction drum secured thereto, a driven shaft, a member mounted on the driven shaft and adapted for rotation therewith, a plurality of rack bars mounted on the member and adapted for axial movement thereon, friction shoes, eccentrics having gear segments thereon operatively engaging the rack bars, links connecting the eccentrics to the friction shoes, whereby the latter may be moved into or out of driving engagement with the drum, when the eccentrics are rotated by axial movement of the rack bars, means for varying the lengths of the links to accurately adjust the friction shoes to the drum, and means constantly urging the eccentrics in a direction to force the friction shoes into driving engagement with the drum.

3. In a clutch of the class described, a drive shaft, a friction drum secured thereto, a driven shaft, a member mounted on the driven shaft and adapted for rotation therewith, a plurality of rack bars mounted on said member and adapted for axial movement thereon, friction shoes, guides on said member for supporting the friction shoes and whereby they are adapted for radial movement, rotatable elements having teeth on their peripheries engaging the rack bars, and pivoted means connecting said elements to the friction shoes, whereby the latter may be moved into or out of driving engagement with the drum, when the elements are rotated by axial movement of the rack bars.

4. In a clutch of the class described, a drive shaft, a friction drum secured thereto, a driven shaft, a member mounted on the driven shaft and adapted for rotation therewith, a plurality of rack bars mounted on the member and adapted for axial movement thereon, friction shoes, rotatable elements having gear segments operatively engaging the rack bars, links connecting said elements to the friction shoes, whereby the latter may be moved into or out of driving engagement with the drum, when the elements are rotated by axial movement of the rack bars, means for varying the lengths of the links to accurately adjust the friction shoes to the drum, and means constantly tending to rotate said elements in a direction to force the friction shoes into driving engagement with the drum.

5. In a clutch of the class described, a drive shaft, a friction drum secured thereto, a driven shaft, a member having a hub mounted on the driven shaft and adapted for rotation therewith, a plurality of friction shoes guidingly supported in said member and adapted for radial movement therein, elements mounted for rotation on said hub and having pivoted links operatively connecting them to said friction shoes, an annular member mounted for sliding movement on the hub and having driving connections with the peripheries of said elements, a plurality of springs supported in said hub and constantly urging said annular member in a direction to move the friction shoes into operative engagement with the drum, and means for actuating said annular member to move the friction shoes out of driving engagement with the drum.

HARRY W. McDONALD.